US012763396B2

(12) United States Patent
Schmitt et al.

(10) Patent No.: US 12,763,396 B2
(45) **Date of Patent: *Oct. 13, 2026**

(54) BATTERY MODULE AND METHOD FOR PRODUCING SUCH A BATTERY MODULE

(71) Applicant: Robert Bosch GmbH, Stuttgart (DE)

(72) Inventors: Markus Schmitt, Tamm (DE); Holger Knesch, Ludwigsburg (DE); Martin Kassner, Weil der Stadt (DE); Roman Marx, Moensheim (DE)

(73) Assignee: Robert Bosch GmbH, Stuttgart (DE)

( * ) Notice: Subject to any disclaimer, the term of this patent is extended or adjusted under 35 U.S.C. 154(b) by 731 days.

This patent is subject to a terminal disclaimer.

(21) Appl. No.: 17/860,683

(22) Filed: Jul. 8, 2022

(65) Prior Publication Data

US 2023/0018957 A1 Jan. 19, 2023

(30) Foreign Application Priority Data

Jul. 13, 2021 (DE) ......................... 102021207406.5

(51) Int. Cl.
*H01M 10/653* (2014.01)
*H01M 10/613* (2014.01)
(Continued)

(52) U.S. Cl.
CPC ....... *H01M 10/653* (2015.04); *H01M 10/613* (2015.04); *H01M 10/647* (2015.04); *H01M 10/6556* (2015.04); *H01M 50/209* (2021.01)

(58) Field of Classification Search
CPC ............. H01M 10/653; H01M 10/613; H01M 10/647; H01M 10/6556; H01M 50/209;
(Continued)

(56) References Cited

U.S. PATENT DOCUMENTS 10,186,697 B1 1/2019 Harris, III
2009/0239137 A1 9/2009 Kakuchi et al.
(Continued)

FOREIGN PATENT DOCUMENTS

DE 102011076580 A1 11/2012
DE 102012223566 A1 6/2014
(Continued)

OTHER PUBLICATIONS

English Translation of JP-H06188023-A (Year: 1994).*
(Continued)

*Primary Examiner* — Niki Bakhtiari
*Assistant Examiner* — Madison Leigh Kyle
(74) *Attorney, Agent, or Firm* — Michael Best & Friedrich LLP

(57) ABSTRACT

The invention relates to a battery module having a plurality of prismatic battery cells (2, 20), which are arranged next to one another in a longitudinal direction (4) of the battery module (1) and furthermore are braced with one another, wherein the plurality of battery cells (2) are received in an interior (30) of a housing (3) of the battery module (1) and additionally a bottom surface (31) of the housing (3) of the battery module (1) and a bottom surface (21) of the battery cells (2) are respectively cohesively connected to one another, wherein a compressing element (11) is arranged between the housing (3) and the plurality of battery cells (2) in the longitudinal direction (4) of the battery module (1), which compressing element tapers perpendicularly to the longitudinal direction (4) of the battery module (1) in the direction of the bottom surface (31) of the housing (3).

20 Claims, 7 Drawing Sheets

(51) Int. Cl.

*H01M 10/647* (2014.01)
*H01M 10/6556* (2014.01)
*H01M 50/209* (2021.01)

(58) Field of Classification Search

CPC ......... H01M 10/0525; H01M 10/6555; H01M 2220/20; H01M 10/0481; H01M 10/625; H01M 10/655; H01M 10/6557; H01M 50/103; H01M 50/264; H01M 50/289; H01M 50/291; H01M 50/244; Y02E 60/10

See application file for complete search history.

(56) References Cited

U.S. PATENT DOCUMENTS

| | | | | |
|---|---|---|---|---|
| 2011/0027630 | A1 | 2/2011 | Tsutsumi et al. | |
| 2011/0293973 | A1 | 12/2011 | Kim | |
| 2013/0059190 | A1 | 3/2013 | Kossakovski et al. | |
| 2014/0087231 | A1 | 3/2014 | Schaefer et al. | |
| 2014/0266066 | A1 | 9/2014 | Turon Teixidor et al. | |
| 2015/0037616 | A1 | 2/2015 | Wyatt et al. | |
| 2016/0149180 | A1* | 5/2016 | Tokoo | H01M 10/613 429/154 |
| 2016/0301117 | A1 | 10/2016 | Tyler et al. | |
| 2017/0170510 | A1 | 6/2017 | Turon Teixidor et al. | |
| 2018/0138563 | A1 | 5/2018 | Behm et al. | |
| 2019/0044113 | A1 | 2/2019 | Wagner et al. | |
| 2020/0112072 | A1* | 4/2020 | Schmitt | H01M 10/6556 |
| 2020/0127257 | A1 | 4/2020 | Lee et al. | |
| 2020/0203784 | A1 | 6/2020 | Shimizu et al. | |
| 2020/0388844 | A1 | 12/2020 | Richey | |
| 2021/0005856 | A1 | 1/2021 | Norimine et al. | |
| 2021/0226275 | A1* | 7/2021 | Enkirch | H01M 10/625 |
| 2021/0351454 | A1 | 11/2021 | Vizzini et al. | |
| 2022/0093991 | A1 | 3/2022 | Cournoyer et al. | |
| 2023/0018065 | A1 | 1/2023 | Schmitt et al. | |
| 2023/0020447 | A1 | 1/2023 | Schmitt | |
| 2023/0022636 | A1 | 1/2023 | Schmitt et al. | |

FOREIGN PATENT DOCUMENTS

| | | | | | |
|---|---|---|---|---|---|
| DE | 102013201021 | A1 | | 7/2014 | |
| DE | 102014218330 | A1 | | 3/2016 | |
| DE | 102015214185 | A1 | * | 2/2017 | |
| DE | 102015217630 | A1 | | 3/2017 | |
| DE | 102017219556 | A1 | | 5/2019 | |
| DE | 102018205896 | A1 | * | 10/2019 | H01M 50/20 |
| DE | 102019006234 | A1 | | 3/2021 | |
| DE | 102019215006 | A1 | * | 4/2021 | |
| DE | 102019215636 | A1 | | 4/2021 | |
| EP | 2324526 | A1 | | 5/2011 | |
| EP | 2360768 | A1 | | 8/2011 | |
| EP | 3694036 | A1 | | 8/2020 | |
| EP | 3723156 | A1 | * | 10/2020 | H01M 50/20 |
| JP | H06188023 | A | * | 7/1994 | H01M 8/247 |
| JP | 2016085895 | A | | 5/2016 | |
| JP | 2016204255 | A | | 12/2016 | |
| KR | 100739841 | B1 | | 7/2007 | |
| WO | WO-2014072119 | A1 | * | 5/2014 | H01M 2/024 |
| WO | WO-2019221376 | A1 | * | 11/2019 | B60L 50/64 |

OTHER PUBLICATIONS

English Translation of WO-2019221376-A1 (Year: 2019).*

English translation of DE-102018205896-A1 (Year: 2019).*

English Translation of DE-102019215006-A1 (Year: 2021).*

English Translation of DE-102015214185-A1 (Year: 2017).*

English Translation of WO-2014072119-A1 (Year: 2014).*

Non-final Office Action issued by the U.S. Patent Office for U.S. Appl. No. 17/860,727 dated Mar. 27, 2025 (16 pages).

Non-final Office Action issued by the U.S. Patent Office for U.S. Appl. No. 17/861,295 dated Mar. 27, 2025 (29 pages).

Non-final Office Action issued by the U.S. Patent Office for U.S. Appl. No. 17/861,294 dated Feb. 26, 2025 (19 pages).

Final Office Action issued by the U.S. Patent Office for U.S. Appl. No. 17/861,294 dated Sep. 5, 2025 (24 pages).

Final Office Action issued by the U.S. Patent Office for U.S. Appl. No. 17/861,295 dated Oct. 2, 2025 (27 pages).

Final Office Action issued by the U.S. Patent Office for U.S. Appl. No. 17/860,727 dated Aug. 7, 2025 (13 pages).

Non-final Office Action issued by the U.S. Patent Office for U.S. Appl. No. 17/861,294 dated Nov. 7, 2025 (27 pages).

Notice of Allowance issued by the U.S. Patent Office for U.S. Appl. No. 17/860,727 dated Dec. 9, 2025 (12 pages).

Non-final Office Action issued by the U.S. Patent Office for U.S. Appl. No. 17/860,727 dated Jan. 28, 2026 (18 pages).

Non-final Office Action issued by the U.S. Patent Office for U.S. Appl. No. 17/861,295 dated Jan. 12, 2026 (30 pages).

* cited by examiner

BATTERY MODULE AND METHOD FOR PRODUCING SUCH A BATTERY MODULE

BACKGROUND OF THE INVENTION

The invention proceeds from a battery module having a plurality of prismatic battery cells, in particular lithium-ion battery cells, which are arranged next to one another in a longitudinal direction of the battery module and furthermore are braced with one another, wherein the plurality of battery cells are received in an interior of a housing of the battery module and additionally a bottom surface of the housing of the battery module and a bottom surface of the battery cells are respectively cohesively connected to one another, in particular in an adhesively bonded manner. The present invention also relates to a method for producing such a battery module.

It is known from the prior art that a battery module has a plurality of individual battery cells which each have a positive voltage tap and a negative voltage tap, wherein, for the purpose of electrically conductively connecting the plurality of battery cells to one another in series and/or in parallel, the respective voltage taps are electrically conductively connected to one another and therefore can be interconnected to form the battery module. Battery modules, for their part, are further interconnected to form batteries or to form entire battery systems.

In particular, lithium-ion battery cells or lithium-polymer battery cells heat up as a result of chemical conversion processes in their interior, particularly in the case of rapid energy release or absorption in battery systems. The more powerful the battery system, the more it is heated up and consequently an efficient active thermal management system is required.

Temperature control is primarily in the form of liquid temperature control, for example using a water/glycol mixture. The temperature-control fluid is conducted, for example, through ducts in a cooling element arranged below the battery cells. In addition, these cooling elements are connected to a cooling circuit.

In addition, it is known from the prior art in this respect to remove heat from the battery cells via their cell bottoms, wherein the flow of heat passes through the bottom of the cell housing and a cooling plate into the cooling medium. Thermal contact-connection between the cell bottom and the cooling element is implemented by means of what is known as a thermal interface material (TIM), this possibly being, for example, a thermally conductive adhesive, what is known as a gap filler or what is known as a gap pad.

Prior art documents in this respect include, for example, KR 100 739 841, US 2017/0170510 or JP 2016/0085895.

SUMMARY OF THE INVENTION

A battery module according to the invention offers the advantage that reliable accommodation of a plurality of battery cells over the service life thereof is provided overall.

According to the invention, a battery module having a plurality of prismatic battery cells, which are in the form of lithium-ion battery cells in particular, is provided for this purpose. Here, the battery cells are arranged next to one another in a longitudinal direction of the battery module and furthermore are braced with one another. Furthermore, the plurality of battery cells are received in an interior of a housing of the battery module. In addition, a bottom surface of the housing of the battery module and a bottom surface of the battery cells are respectively cohesively connected to one another. In particular, this connection is formed in an adhesively bonded manner by means of an adhesive which can preferably contain thermally conductive additives. A compressing element is arranged between the housing of the battery module and the plurality of battery cells in the longitudinal direction of the battery module. Here, the compressing element tapers perpendicularly to the longitudinal direction of the battery module in the direction of the bottom surface of the housing of the battery module.

At this point, it should be noted that prismatic battery cells each comprise a battery cell housing with a total of six side surfaces, pairs of which are arranged opposite and substantially parallel to one another. Furthermore, side surfaces arranged adjacent to one another are arranged at a right angle to one another. The electrochemical components of the respective battery cell are received in an interior of the battery cell housing. Usually, two voltage taps, such as a positive voltage tap and a negative voltage tap in particular, are arranged on an upper side surface, referred to as the top surface. The lower side surface arranged opposite the upper side surface is referred to as the bottom surface.

In the case of arrangement of the battery cells next to one another in a longitudinal direction of the battery module, the battery cells are arranged adjacent to one another by way of their respectively largest side surfaces, which are each arranged in particular a right angle to the upper side surface and the lower side surface. At this point, it should be noted that the longitudinal direction of the battery module is accordingly arranged perpendicularly to the largest side surfaces of the battery cells in this case.

At this point, it should be noted that, in order to form a cohesive connection formed in an adhesively bonded manner between the bottom surface of the housing of the battery module and the bottom surface of the battery cells by means of an adhesive, either preferably initially the adhesive can be dispensed into the housing of the battery module or onto the bottom surface of the housing of the battery module and/or the adhesive can also be dispensed onto the respective battery cell. Here, the cohesive connection formed in an adhesively bonded manner serves firstly to improve the conduction of heat between the bottom surface of the battery cell and the bottom surface of the housing and secondly for mechanical load transfer.

It is expedient when the compressing element has two contact surfaces. Here, a first of the two contact surfaces is arranged, in particular, so as to make mechanical contact with the housing of the battery module, and a second of the two contact surfaces is arranged here, in particular, so as to make mechanical contact with a battery cell, arranged at an end, of the plurality of battery cells or an end plate described further below. Here, the two contact surfaces are arranged at an angle of at least four degrees with respect to one another. Here, the contact surfaces are furthermore designed, in particular, with such dimensions that thermal decoupling between the housing and the plurality of battery cells is ensured. In particular, the contact surfaces should be designed here with such a size that, at the beginning of the service life, reliable contact and positioning of the plurality of battery cells in the housing of the battery module are achieved until the thermally conductive adhesive cures, and that swelling forces, which are produced at the end of the service life, of the plurality of battery cells can be reliably transferred to the housing of the battery module, without the compressing element itself being mechanically damaged. Furthermore, the compressing element serves to compensate for both tolerances of the housing and of the plurality of battery cells. In order to ensure this, the compressing element is inserted in the vertical direction of the battery module in the direction of the bottom surface of the housing of the battery module, in particular until defined compression of the plurality of battery cells is formed.

It is advantageous when the compressing element is received in a form-fitting manner in a receptacle of the housing of the battery module. As a result, reliable fastening of the compressing element can be formed. In particular, the receptacle forms an angle of at least four degrees with respect to a vertical direction of the battery module arranged perpendicularly to the longitudinal direction. As a result, the process of receiving the compressing element can be simplified. At this point, it should be noted that the receptacle forms a further contact surface on which, in particular, the first of the two contact surfaces of the compressing element is arranged so as to make mechanical contact. In particular, even this contact surface forms the angle of at least four degrees with respect to the vertical direction of the battery module arranged perpendicularly to the longitudinal direction. The compressing element is particularly preferably arranged so as to make linear contact with the housing or the receptacle of the housing.

At this point, it should be noted that the housing of the battery module is preferably designed in the form of die-cast components, for example from a metal material.

According to a preferred embodiment of the invention, a supporting element is arranged opposite the compressing element in the longitudinal direction of the battery module. Here, the supporting element is arranged between the housing of the battery module and the plurality of battery cells. In particular, the supporting element is arranged between the housing and a battery cell, arranged at an end, of the plurality of battery cells or an end plate, yet to be described below.

The supporting element preferably has an opening and contact surfaces. In particular, the supporting element has first contact surfaces, which are formed to make mechanical contact with the housing of the battery module, and second contact surfaces, which are formed to make mechanical contact with a battery cell, arranged at an end, of the plurality of battery cells or an end plate yet to be described below. Owing to the design with an opening, comparably small contact surfaces can be formed for establishing mechanical contact between the battery cell arranged at an end or the end plate yet to be described and the housing, as a result of which thermal decoupling is ensured. In particular, the contact surfaces should be designed with such a size that, at the beginning of the service life, reliable contact and positioning of the plurality of battery cells in the housing of the battery module are achieved until the thermally conductive adhesive cures, and that swelling forces, which are produced at the end of the service life, of the plurality of battery cells can be reliably transferred to the housing of the battery module, without the compressing element itself being mechanically damaged. The supporting element is particularly preferably formed from a polymeric material, such as in the form of a plastic injection-molded part for example.

At this point, it should additionally be noted that the supporting element is designed in such a way that tolerances between the housing of the battery module and the plurality of battery cells can be reliably compensated for.

It is particularly expedient when the battery module has two compressing elements. Here, the two compressing elements are arranged at the same end of the plurality of battery cells. This offers the particular advantage that even better compensation is possible, wherein the two compressing elements can be reliably arranged in particular independently of one another and in each case autonomously. For example, the two compressing elements can be inserted to different extents. In addition, swelling forces, which are produced as a result, of the battery cells can be uniformly transferred to the housing of the battery module via the two compressing elements, as a result of which reaction forces which are produced in different ways on one side can be avoided.

It is furthermore also expedient when the housing of the battery module comprises a temperature-control element directly adjacent to the bottom surface of the battery cells. In particular, this temperature-control element is in the form of a temperature-control chamber through which temperature-control fluid can flow. For example, the housing of the battery module can have an integrated temperature-control chamber for this purpose. In a preferred embodiment, the plurality of battery cells is thermally conductively connected to the bottom surface of the housing in particular by means of a thermally conductive adhesive, as a result of which heat can be transferred from the bottom surface of the respective battery cell to the temperature-control element. The thermally conductive adhesive therefore serves to establish thermal contact between the temperature-control element and the plurality of battery cells.

The plurality of battery cells are preferably arranged between two end plates. At this point, it should be noted that the battery cells arranged opposite in the longitudinal direction of the battery module and at an end are respectively arranged adjacent to one of the two end plates. The two end plates are braced with one another by means of at least one clamping element. In particular, the clamping element is in the form of a clamping band. Here, the at least one clamping element is preferably cohesively connected to the end plates. For example, this connection can preferably be formed in a welded manner. The battery module particularly preferably comprises two clamping elements which are each preferably in the form of a clamping band and/or which are arranged opposite one another on the plurality of battery cells, wherein a first end of the respective clamping element is respectively connected to a first of the two end plates and a second end of the respective clamping element is respectively connected to a second of the two end plates. Here, these connections are preferably formed in a cohesive manner, such as in particular in a welded manner. A cohesive connection between the at least one clamping element and the end plates can advantageously transfer comparably high forces. At this point, it should be noted that a comparably low initial pre-stressing force can be formed by the compressing element owing to the pre-stressing or pre-pressing of the plurality of battery cells formed by means of the clamping element at the beginning of the service life.

An adhesive is particularly preferably arranged between a side surface of a battery cell and the clamping element. Here, the adhesive can furthermore have thermally conductive additives. Therefore, a situation where the adhesive is in the form of a thermally conductive adhesive is particularly preferred. In particular, said adhesive can be selected to be the same adhesive as that which forms a cohesive connection between the bottom surface of the housing of the battery module and the bottom surface of the battery cell. At this point, it should be noted that here the side surface of the battery cell is in each case arranged perpendicularly to the largest side surfaces of the battery cell. For production purposes, here, the adhesive can initially be applied either to the respective side surface of the battery cell or else to the clamping element. The connection formed in an adhesively bonded manner between a side surface of a battery cell and the clamping element advantageously forms a secondary mechanical load path, as a result of which, overall, the adhesive connection between the bottom surface of the housing of the battery module and the bottom surface of a battery cell is subject to lower loads during operation of the battery module.

The supporting element is advantageously connected in a form-fitting or cohesive manner to an end plate or to the housing. This allows comparably simple production of the battery module.

The compressing element is particularly preferably formed from a polymeric material, such as in the form of a plastic injection-molded part for example.

A respective spacer element is preferably arranged between two battery cells arranged adjacent to one another. In particular, the spacer element of this kind is accordingly arranged adjacent to the respectively largest side surfaces of the battery cells, between which the spacer element is arranged. Spacer elements of this kind can in particular prevent direct contact between the battery cells respectively arranged adjacent to one another and therefore form a defined spacing between the battery cells of this kind. As a result, thermal insulation and/or electrical insulation can be formed.

Overall, an embodiment according to the invention of the battery module offers the advantage that the compressing element, in particular its two contact surfaces, makes/make mechanical contact with the housing and the plurality of battery cells or the respective end plate and that, opposite to this, the supporting element, in particular its two contact surfaces, makes/make mechanical contact with the housing and the plurality of battery cells or the respective end plate, as a result of which positioning and fixing of the plurality of battery cells in the housing is ensured both at the beginning of the service life (BoL for short) and at the end of the service life (EoL for short).

A mechanical load is transferred from the plurality of battery cells, via the cohesive connection, to the bottom surface of the housing of the battery module via what is known as a primary mechanical load path on the bottom of the housing of the battery module during operation. Such a mechanical load can include, in particular, swelling forces of the battery cells produced during operation both at the beginning of the service life and at the end of the service life. Here, the forces are the greatest at the battery cells which are arranged at an end.

A mechanical load is transferred from the plurality of battery cells, via the cohesive connection formed in an adhesively bonded manner, to the clamping element via what is known as a secondary mechanical load path during operation. Such a mechanical load can also include, in particular, swelling forces of the battery cells produced during operation both at the beginning of the service life and at the end of the service life. Here, the forces are the greatest at the battery cells which are arranged at an end.

In particular, the compressing element and the supporting element exert comparably lower pre-stressing forces on the plurality of battery cells at the beginning of the service life. During operation of the battery module, the swelling forces of the battery cells increase comparably sharply from the beginning of the service life to the end of the service life and thus stress the primary mechanical load path and the secondary mechanical load path to a greater extent than at the beginning of the service life. In particular, the stresses within the cohesive connection between the battery cells arranged at an end and the housing increase comparably sharply. In order to reduce and thereby to limit stresses occurring within the cohesive connection, such as in particular within the connection formed in an adhesively bonded manner, between the bottom surface of the housing of the battery module and the bottom surface of the battery cells and also between the clamping element and the side surfaces of the battery cells, the compressing element and the supporting element are supported on the housing. As a result, overall, the mechanical load within the cohesive connection is reduced, in particular at the end of the service life, and failure of said cohesive connection is prevented, as a result of which the reliability of the battery module can be increased overall. In addition, the risk of adequate temperature control of the battery cells no longer being provided on account of failure of the cohesive connection can preferably be considerably reduced. Furthermore, as a result, the properties of the adhesive, such as its strength up to elongation at break for example, can be selected in a comparably larger range as a result. For example, a thermally conductive adhesive with relatively low strength values and better thermal conductivity could be selected.

In particular, the compressing element is arranged so as to make mechanical contact with the housing in such a way that a spacing is always formed between the housing and the end plate or the battery cell at an end. As a result, an air gap with a thermally insulating action is formed.

It should further also be noted that both the compressing element and the supporting element could also be formed from a metal material, as a result of which even higher forces would be able to be transferred in particular. In this case, thermal insulation and/or electrical insulation should be provided in order to thermally and/or electrically insulate the plurality of battery cells from the housing of the battery module.

The present invention also relates to a method for producing a battery module as just described comprising a plurality of prismatic battery cells which are in particular in the form of lithium-ion battery cells and which are arranged next to one another in a longitudinal direction of the battery module and furthermore are braced with one another. Here, the plurality of battery cells are received in an interior of a housing of the battery module and additionally a bottom surface of the housing of the battery module and a bottom surface of the battery cells are respectively cohesively connected to one another, in particular in an adhesively bonded manner by means of an adhesive. Furthermore, a compressing element is arranged between the housing and the plurality of battery cells in the longitudinal direction of the battery module, which compressing element tapers perpendicularly to the longitudinal direction of the battery module in the direction of the bottom surface of the housing.

It is particularly preferred here when the plurality of battery cells are arranged between two end plates, which are braced with one another by way of a clamping element in particular, as a result of which initial compression or prestressing can be formed at the beginning.

Furthermore, a supporting element is preferably arranged opposite the compressing element in the longitudinal direction of the plurality of battery cells.

It is expedient when, for producing the battery module, the plurality of battery cells braced with one another are pushed, in particular together with the spacer elements arranged between adjacent battery cells, the two end plates and the at least one clamping element as an entire unit, in the direction of the supporting element until said supporting element makes contact with the housing and also before, for example, the thermally conductive adhesive cures. In other words, said elements or the entire unit are/is displaced on the adhesive. The compressing element is then inserted into the battery module until defined compression is formed. In particular, in this case, the compressing element can already be pre-fixed to the cell stack or else fixed only after the compressing element has been finally inserted. Owing to the arrangement of the compressing element, tolerances in the arrangement of the plurality of battery cells and/or the housing can be compensated for in this case.

BRIEF DESCRIPTION OF THE DRAWINGS

Exemplary embodiments of the invention are illustrated in the drawings and described in greater detail in the following description.

In the drawings.

DETAILED DESCRIPTION

Figure 1:
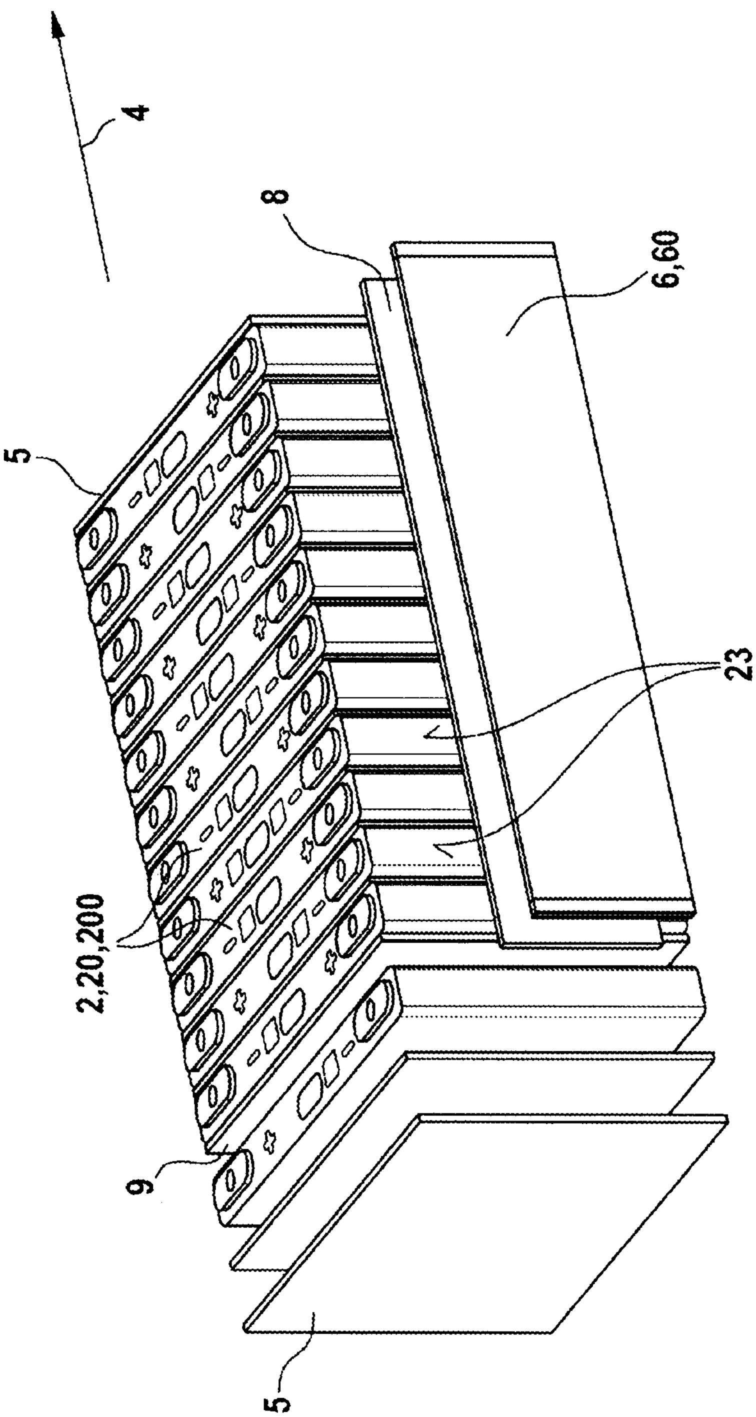
FIG. 1 shows an exploded illustration of a plurality of battery cells braced with one another.

FIG. 1 shows an exploded illustration of a plurality of battery cells 2, braced with one another, which are each in the form of prismatic battery cells 20. In particular, the battery cells 2 are preferably in the form of lithium-ion battery cells 200.

Figure 2:
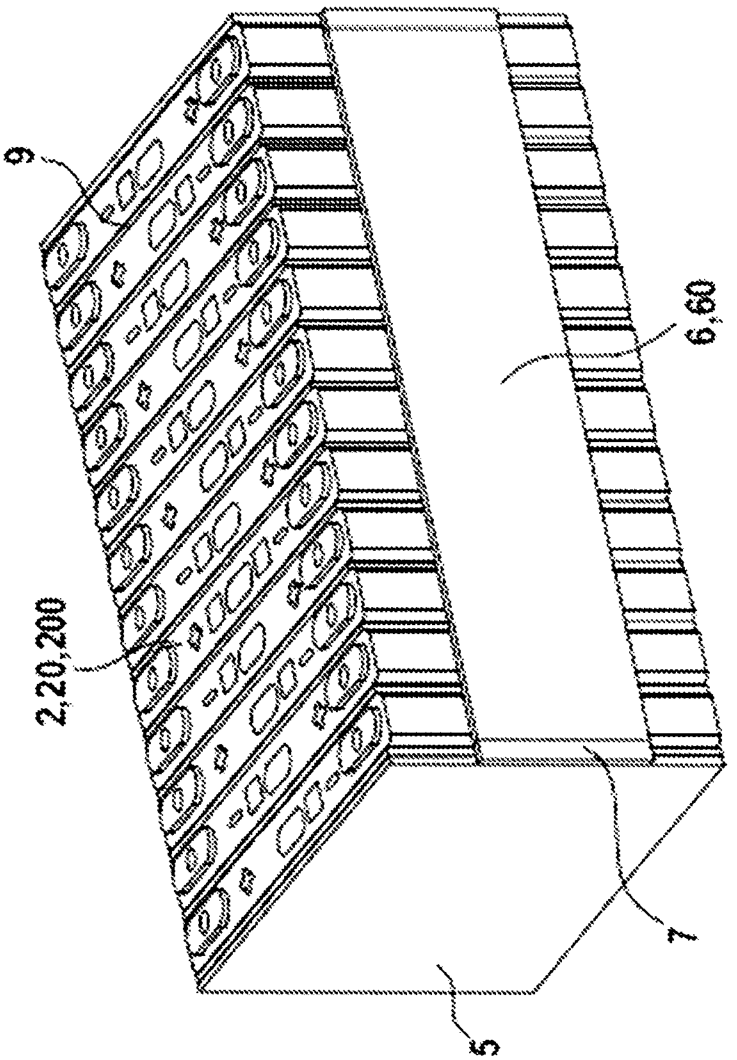
FIG. 2 shows a perspective view of the plurality of battery cells braced with one another in accordance with FIG. 1.

FIG. 2 shows a perspective view of the plurality of battery cells 2, braced with one another, in accordance with FIG. 1. Therefore, FIGS. 1 and 2 should be described together in the text which follows.

In said figures, the battery cells 2 are arranged next to one another in a longitudinal direction 4 of the battery module 1. In addition, the battery cells 2 are braced with one another.

Furthermore, said figure shows that the plurality of battery cells 2 are arranged between two end plates 5. Here, the two end plates 5 and the plurality of battery cells 2 are braced with one another by way of clamping elements 6. In particular, the clamping elements 6 are each in the form of a clamping band 60 here. In particular, FIG. 2 shows that the clamping element 6 is cohesively connected to the end plates 5, such as in particular in a welded manner by means of a welded connection 7.

An adhesive 8, which particularly preferably has thermally conductive additives, is arranged between the clamping element 6 and a side surface 23 of a battery cell 2.

In addition, a respective spacer element 9 is arranged between two battery cells 2 arranged adjacent to one another. A spacer element 9 is also arranged between an end plate 5 and a battery cell 2 arranged at an end.

Figure 3:
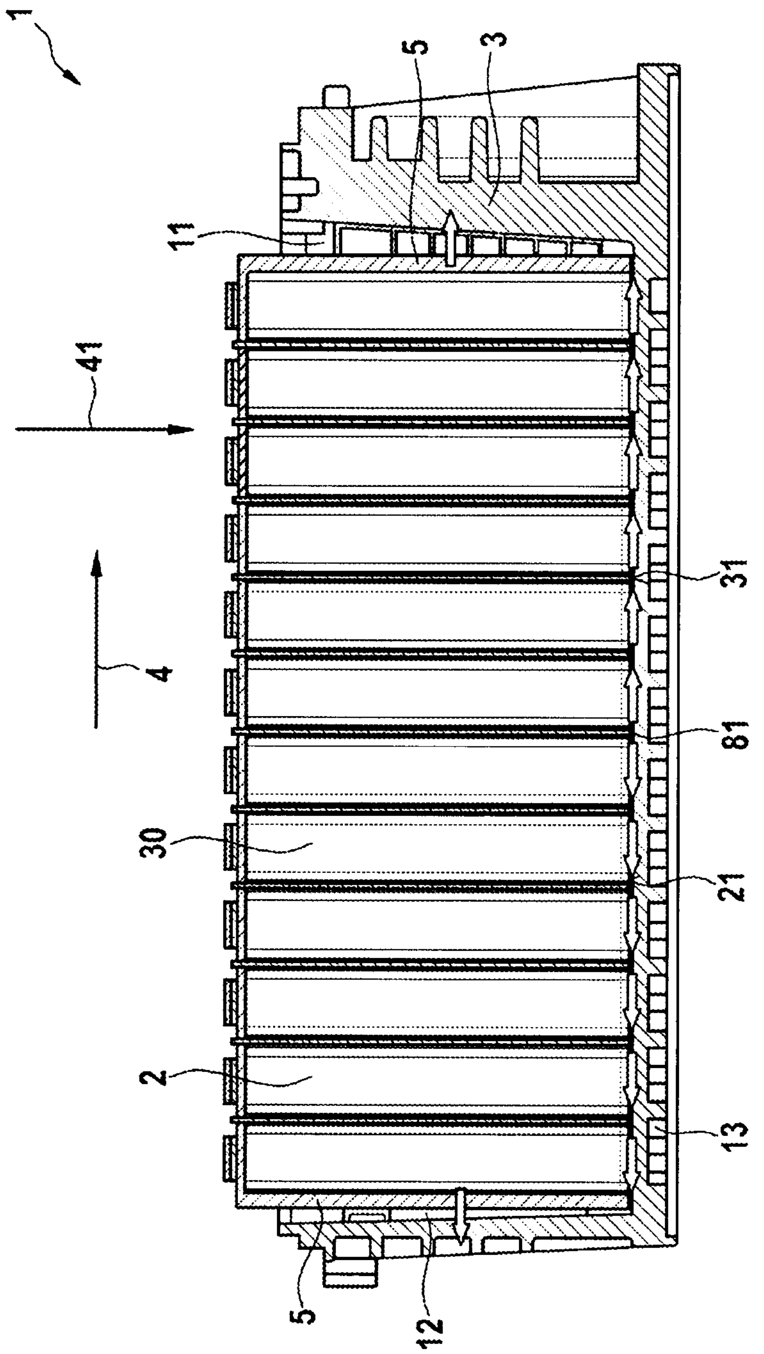
FIG. 3 shows a sectional view of an embodiment of a battery module according to the invention from the side.

FIG. 3 shows a sectional view of an embodiment of a battery module 1 according to the invention from the side.

Said figure shows that the plurality of battery cells 2 are received in an interior 30 of a housing 3 of the battery module 1.

Furthermore, a bottom surface 31 of the housing 3 of the battery module 1 and a bottom surface 21 of the battery cells 2 are respectively cohesively connected to one another. In particular, this connection can be formed by means of an adhesive 81.

Here, the housing 3 of the battery module 1 comprises a temperature-control element 13 directly adjacent to the bottom surfaces 21 of the battery cells 2.

A compressing element 11 is arranged between the housing 3 of the battery module 1 and the plurality of battery cells 2 in the longitudinal direction 4 of the battery module 1. Here, the compressing element 11 tapers perpendicularly to the longitudinal direction 4 of the battery module 1 in the direction of the bottom surface 31 of the housing 3 of the battery module 1. In particular, this taper is formed in a vertical direction 41, which is arranged perpendicularly to the longitudinal direction 4.

Furthermore, said figure shows that a supporting element 12 is arranged between the housing 3 of the battery module 1 and the plurality of battery cells 2 opposite the compressing element 11 in the longitudinal direction 4 of the battery module 1.

Furthermore, FIG. 3 shows the above-described primary mechanical load path, in which, on the bottom of the housing 3 of the battery module 1, a mechanical load is transferred from the plurality of battery cells 2 to the bottom surface 31 of the housing 3 of the battery module 1 via the cohesive connection during operation. Furthermore, a force is transferred via the supporting element 12 and the compressing element 11 to the housing 3 of the battery module 1.

Figure 4:
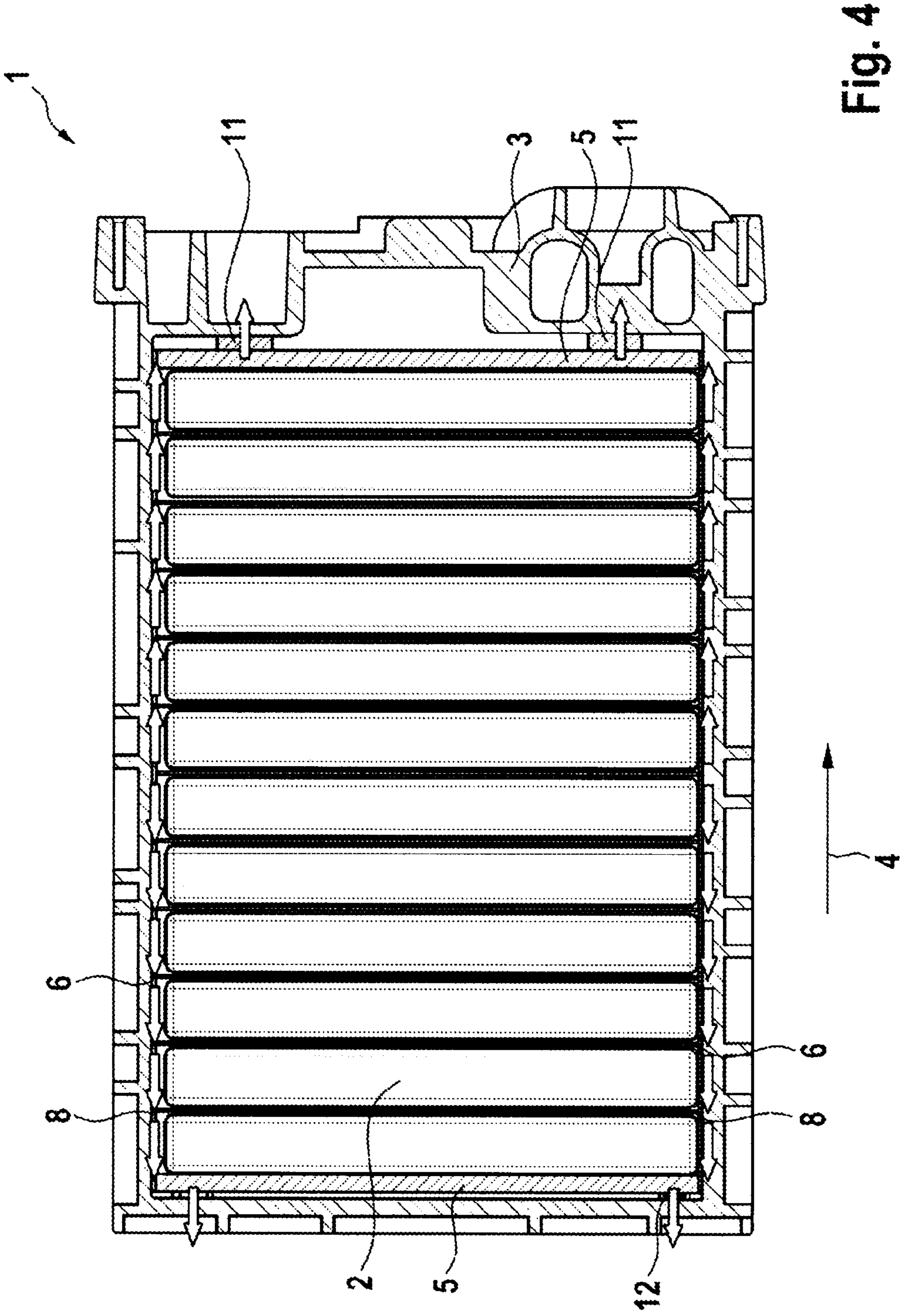
FIG. 4 shows a sectional view of the embodiment of the battery module according to the invention in accordance with FIG. 3 from above.

FIG. 4 shows a sectional view of the embodiment of the battery module 1 according to the invention in accordance with FIG. 3 from above.

FIG. 4 shows that the battery module 1 preferably has two compressing elements 11.

Furthermore, FIG. 4 shows the above-described secondary mechanical load path, in which a mechanical load is transferred from the plurality of battery cells 2 to the clamping element 6 via the cohesive connection formed in an adhesively bonded manner during operation. Furthermore, a force is transferred to the housing 3 of the battery module 1 via the supporting element 12 and the compressing element 11.

Figure 5:
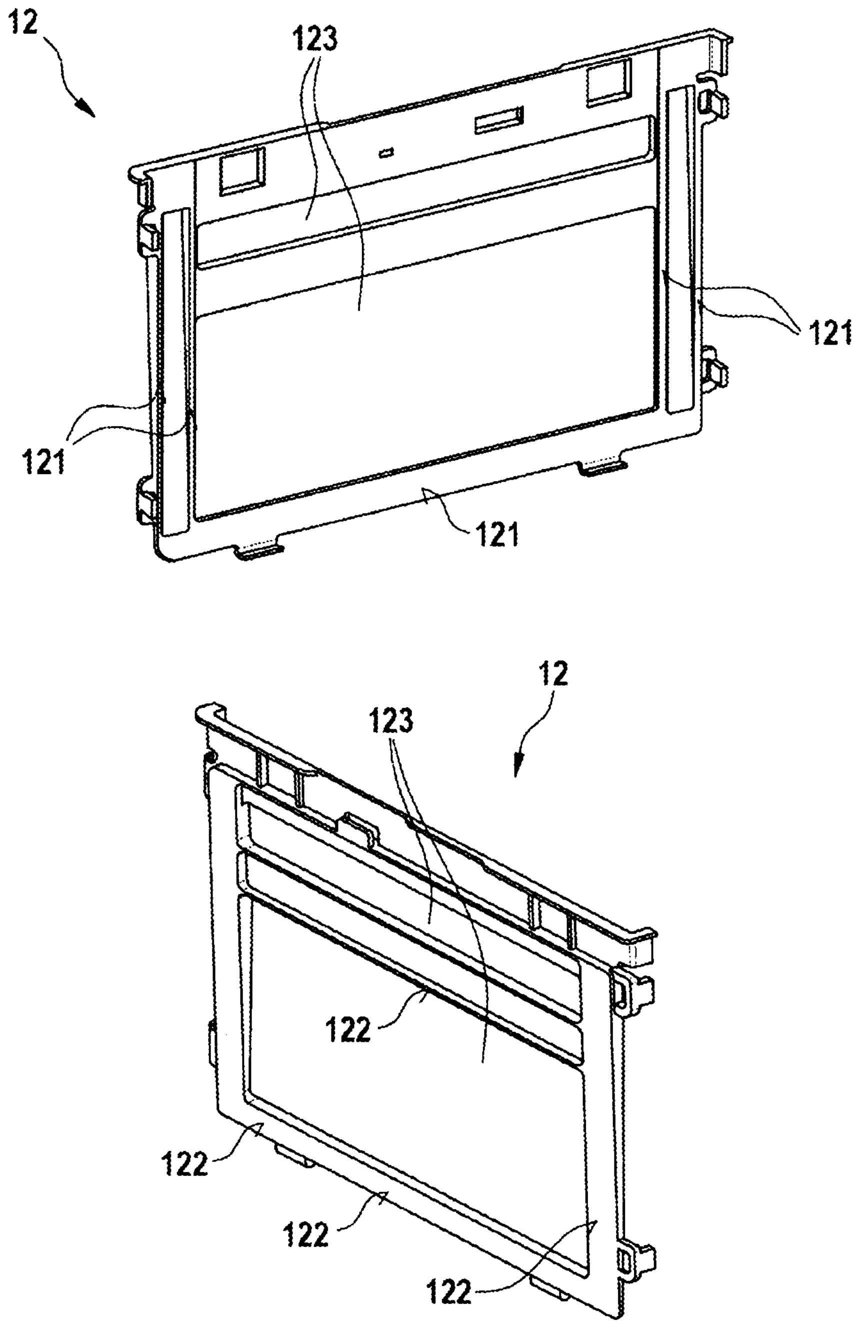
FIG. 5 shows an embodiment of a supporting element.

FIG. 5 shows an embodiment of a supporting element 12.

The left-hand-side illustration in said figure shows a first view with contact surfaces 121, which are formed to make mechanical contact with the end plates 5. Furthermore, the right-hand-side illustration shows a second view with contact surfaces 122, which are formed to make mechanical contact with the housing 3 of the battery module 1.

Furthermore, the supporting element 12 has an opening 123. Said opening 123 serves to ensure thermal decoupling.

Figure 6:
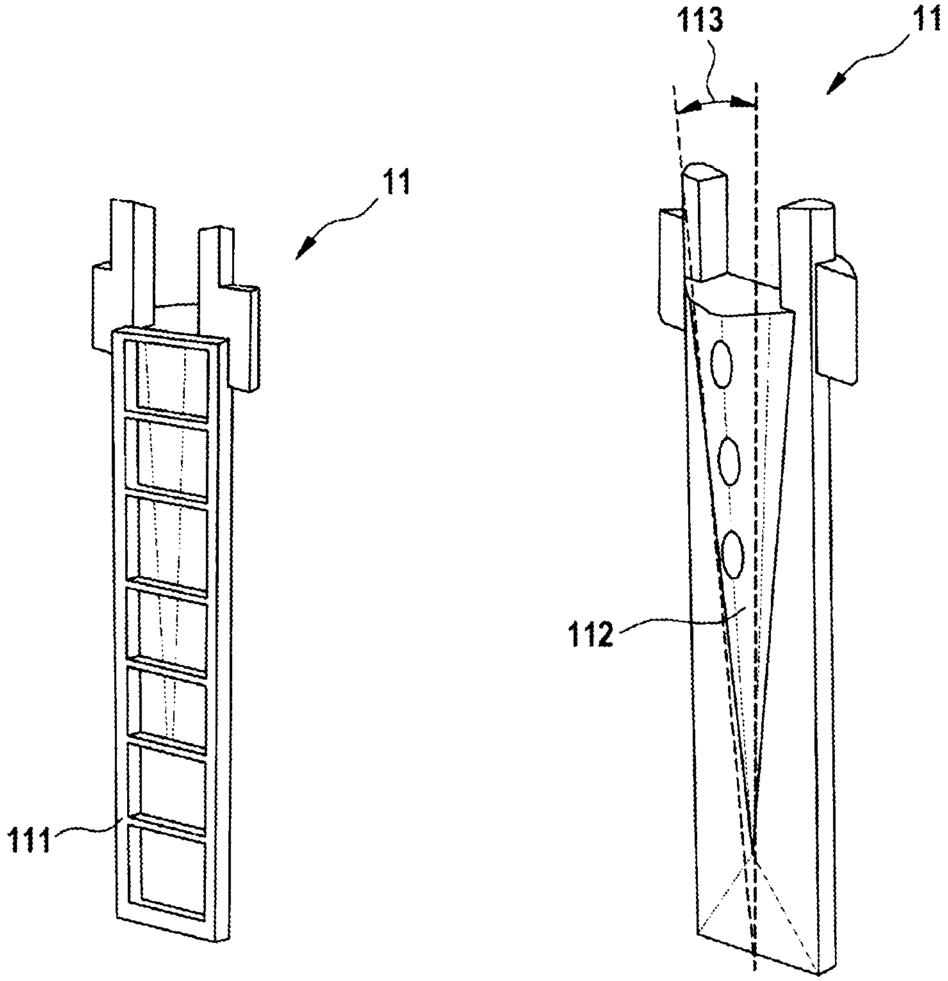
FIG. 6 shows an embodiment of a compressing element.

FIG. 6 shows an embodiment of a compressing element 11.

The left-hand-side illustration of said figure shows a first view with a first contact surface 111 which is formed to make mechanical contact with the end plates 5. Furthermore, the right-hand side illustration shows a second view with a second contact surface 112 which is formed to make mechanical contact with the housing 3 of the battery module 1. In particular, the second contact surface 112 is in the form of a linear contact here.

Said figure shows that the first contact surface 111 and the second contact surface 112 are arranged at an angle 113 with respect to one another, wherein the angle has, in particular, a value of at least four degrees.

A compressing element 11 of this kind is particularly preferably formed from a polymeric material.

Figure 7:
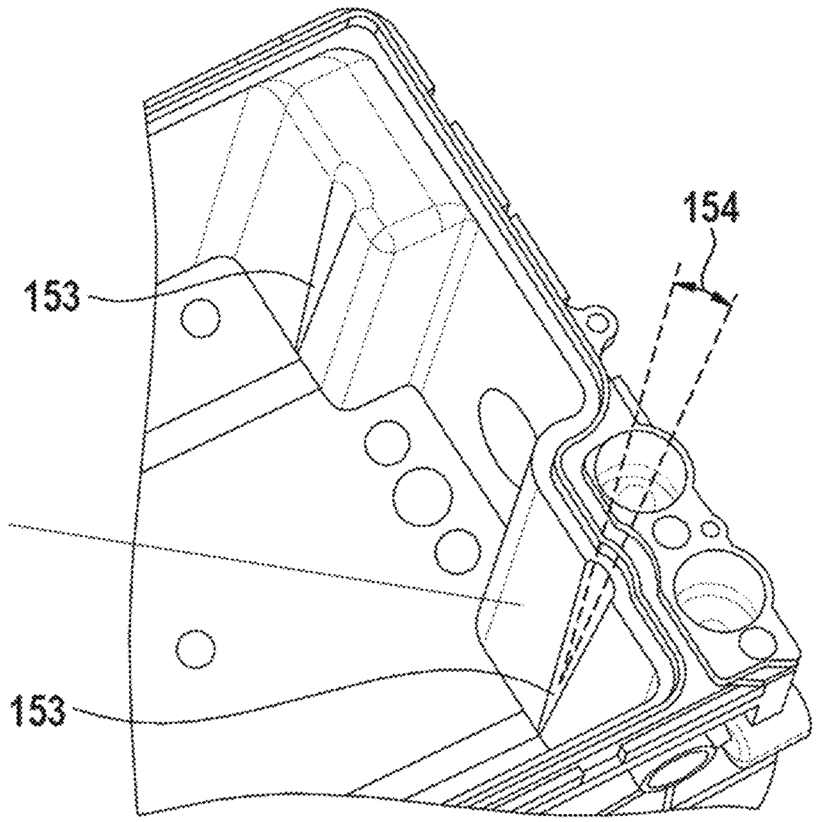
FIG. 7 shows an embodiment of a housing of the battery module.

FIG. 7 shows an embodiment of a housing 3 of the battery module 1.

The left-hand-side illustration in said figure shows the inner side 151 of the housing 3 of the battery module 1, on which inner side the supporting element 12 is arranged.

The right-hand-side illustration in said figure shows the inner side 152 of the housing 3 of the battery module 1, on which inner side the compressing element 11 is arranged or the compressing elements 11 are arranged.

Said figure shows that the housing 3 of the battery module 1 comprises receptacles 153 in which a respective compressing element 11 can be received in a form-fitting manner. In particular, the receptacles 153 in this case are in the form of guide grooves in which the linear contact of the compressing element 11 can preferably be received. That is to say, linear or in other words very narrow contact is formed between the receptacle 153 and the compressing element 11.

Furthermore, a receptacle 153 can also form an angle 154 which is formed with respect to a vertical direction 41 of the battery module 1 arranged perpendicularly to the longitudinal direction 4 of the battery module 1 and has a value of at least four degrees.

What is claimed is:

1. A battery module having a plurality of prismatic battery cells (2, 2), which are arranged next to one another in a longitudinal direction (4) of the battery module (1) and furthermore are braced with one another, wherein the plurality of prismatic battery cells (2) are received in an interior (30) of a housing (3) of the battery module (1) and additionally a bottom surface (31) of the housing (3) of the battery module (1) and a bottom surface (21) of the plurality of prismatic battery cells (2) are respectively cohesively connected to one another, wherein a first compressing element (11) and a second compressing element (11) are each arranged between the housing (3) and a single end-most prismatic battery cell (2) of the plurality of prismatic battery cells (2) on a same longitudinal end of the battery module (1), wherein the first compressing element and the second compressing element each taper perpendicularly to a longitudinal direction (4) of the battery module (1) in a direction of the bottom surface (31) of the housing (3), and wherein the first and second compressing elements (11) are separated from one another to provide an air gap therebetween in a direction perpendicular to the longitudinal direction and therefore also creating an air gap between the housing (3) and the single end-most prismatic battery cell (2) adjacent the first and second compressing elements (11), the first and second compressing elements (11) further being independently insertable into the battery module such that the first and second compressing elements can be inserted into the housing (3) to different extents.

2. The battery module according to claim 1, wherein each of the first and second compressing elements (11) has two contact surfaces (111, 112) which are arranged at an angle (113) of at least four degrees with respect to one another.

3. The battery module according to claim 1, wherein each of the first and second the compressing elements (11) is received in a form-fitting manner in a respective receptacle (153) of the housing (3) of the battery module (1).

4. The battery module according to claim 1, wherein a supporting element (12) is arranged between the housing (3) of the battery module (1) and the plurality of prismatic battery cells (2) opposite the first and second compressing elements (11) in the longitudinal direction (4) of the battery module (1).

5. The battery module according to claim 4, wherein the supporting element (12) comprises an opening (123) and contact surfaces (121, 122).

6. The battery module according to claim 1, wherein the housing (3) comprises a temperature-control element (13) directly adjacent to the bottom surface (21) of the plurality of prismatic battery cells (2).

7. The battery module according to claim 1, wherein the plurality of prismatic battery cells (2) are arranged between two end plates (5) which are braced with one another by way of at least one clamping element (6).

8. The battery module according to claim 7, wherein an adhesive (8) is arranged between a side surface (23) of a battery cell (2) and the clamping element (6).

9. The battery module according to claim 4, wherein the supporting element (12) is connected in a form-fitting or cohesive manner to an end plate (5) or to the housing (3).

10. The battery module according to claim 1, wherein each of the first and second compressing elements (11) is formed from a polymeric material.

11. The battery module according to claim 1, wherein a respective spacer element (9) is arranged between two battery cells (2) arranged adjacent to one another.

12. A method for producing a battery module according to claim 1 wherein the plurality of prismatic battery cells (2) braced with one another are pushed in the direction of a supporting element (12) arranged between the housing (3) and the plurality of prismatic battery cells (2) and also opposite the first and second compressing elements (11) on the plurality of prismatic battery cells (2) until the supporting element (12) makes contact with the housing (3) and then the first and second compressing elements (11) are inserted until defined compression is formed.

13. A battery module having a plurality of prismatic lithium-ion battery cells (200), which are arranged next to one another in a longitudinal direction (4) of the battery module (1) and furthermore are braced with one another, wherein the plurality of prismatic lithium-ion battery cells (2) are received in an interior (30) of a housing (3) of the battery module (1) and additionally a bottom surface (31) of the housing (3) of the battery module (1) and a bottom surface (21) of the plurality of prismatic lithium-ion battery cells (2) are respectively cohesively connected to one another by means of an adhesive, wherein a first compressing element (11) and a second compressing element (11) are each arranged between the housing (3) and a single end-most prismatic lithium-ion battery cell (2) of the plurality of prismatic lithium-ion battery cells (2) on a same longitudinal end of the battery module (1), wherein the first compressing element and the second compressing element each taper perpendicularly to a longitudinal direction (4) of the battery module (1) in a direction of the bottom surface (31) of the housing (3), and wherein the first and second compressing elements (11) are separated from one another to provide an air gap therebetween in a direction perpendicular to the longitudinal direction and therefore also creating an air gap between the housing (3) and the single end-most prismatic lithium-ion battery cell (2) adjacent the first and second compressing elements (11), the first and second compressing elements (11) further being independently insertable into the battery module such that the first and second compressing elements can be inserted into the housing (3) to different extents.

14. The battery module according to claim 13, wherein each of the first and second compressing elements (11) has two contact surfaces (111, 112) which are arranged at an angle (113) of at least four degrees with respect to one another.

15. The battery module according to claim 13, wherein each of the first and second compressing elements (11) is received in a form-fitting manner in a respective receptacle (153) of the housing (3) of the battery module (1), wherein each receptacle (153) forms an angle (154) of at least four degrees with respect to a vertical direction (41) of the battery module (1) arranged perpendicularly to the longitudinal direction (4).

16. The battery module according to claim 13, wherein a supporting element (12) is arranged between the housing (3) of the battery module (1) and the plurality of prismatic lithium-ion battery cells (2) opposite the first and second compressing elements (11) in the longitudinal direction (4) of the battery module (1).

17. The battery module according to claim 16, wherein the supporting element (12) comprises an opening (123) and contact surfaces (121, 122).

18. The battery module according to claim 13, wherein the housing (3) comprises a temperature-control element (13) which is directly adjacent to the bottom surface (21) of the plurality of prismatic lithium-ion battery cells (2), and which is configured as a temperature-control chamber through which temperature-control fluid can flow.

19. The battery module according to claim 13, wherein the plurality of prismatic lithium-ion battery cells (2) are arranged between two end plates (5) which are braced with one another by way of at least one clamping band (60), wherein the at least one clamping band (60) is cohesively connected to the two end plates (5) in a welded manner.

20. The battery module according to claim 19, wherein an adhesive (8) is arranged between a side surface (23) of the plurality of prismatic lithium-ion battery cells (2) and at least one clamping element (6), wherein the adhesive (8) furthermore has thermally conductive additives.

* * * * *